Aug. 31, 1926.

Re. 16,413

J. D. McINTOSH

WIRE ROPE CONNECTING MEANS

Original Filed April 3, 1923

INVENTOR

John D. McIntosh

BY Richard J. Cook

ATTORNEY

Reissued Aug. 31, 1926. Re. 16,413

UNITED STATES PATENT OFFICE.

JOHN D. McINTOSH, OF VANCOUVER, BRITISH COLUMBIA, CANADA.

WIRE-ROPE-CONNECTING MEANS.

Original No. 1,483,516, dated February 12, 1924, Serial No. 629,670, filed April 3, 1923. Application for reissue filed February 2, 1926. Serial No. 85,603.

This invention relates to an improved means for removably connecting the end of one wire rope to the end of another, as in the instance of connecting a choker line to a tagline in logging operations, the object being to effect such connection in a manner that can be quickly connected and released, but is not liable to free itself in use; that is strong in its form and is free from projections liable to encounter obstruction in use.

The invention is fully described in the following specification, reference being made to the drawings by which it is accompanied, in which.

Figure 1:
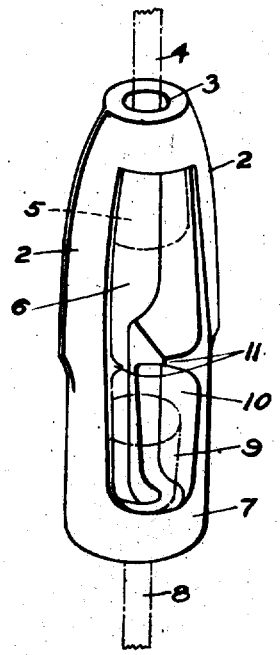
Figure 1 is a perspective view of the connecting means, the connections being shown in dot and dash lines.
Figure 3:
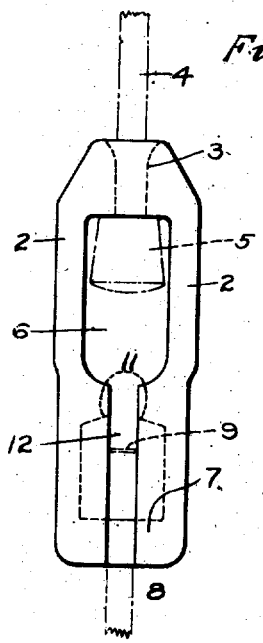
Figure 3 is an elevation looking in the direction of the arrow 3 in Figure 2.

The device comprises a link 2 of forged or cast metal having at one end an axial aperture 3 in which the wire rope of the tagline 4 is relatively permanently connected by a thimbled enlargement 5 in the open space 6 between the sides of the link, that will permit the rope to swivel freely in its connection.

However, as I have above stated that my invention relates to an improved means for removably connecting the end of one wire rope to the end of another, it is to be understood that the tagline 4 may be connected to the upper end of the link 2 in any wellknown manner should a swivel connection, as illustrated, be not desired.

The other end 7 of the link has a corresponding axial aperture for the wire rope 8 of the choker line, which is also provided with a thimbled end 9 for which a chambered enlargement 10 is provided in the link, separated from the space 6 by shouldered projections 11 from each side.

From one side of the axial aperture of 7 is a restricted passage 12 that will permit the choker line 8 to pass through it, but will not allow passage of its enlargement 9.

Figure 2:
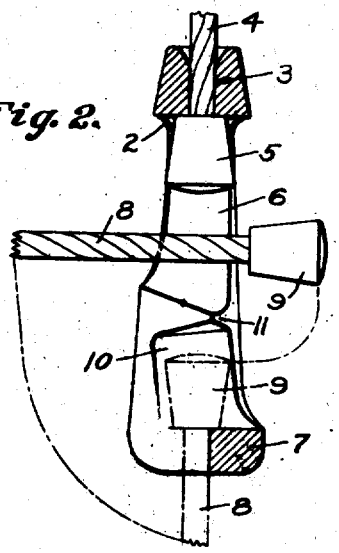
Figure 2 is a vertical section on the line 2—2 in Figure 3, indicating the manner of connecting and releasing the choker line.

The end of the choker line 8 is connected (see Figure 2) by passing its enlargement through the space 6 from that side having the passage 12 and then moving the rope downward through 12, while keeping the enlargement on the opposite side and directing it into the chambering 10.

Time is the essence of success in logging, because the overhead expense is very great and logs from a given section must be removed with the greatest possible speed. Therefore, as a matter of practical concern, it is necessary that coupling and uncoupling be accomplished with as little manual attention as possible. For this reason, it is common practice to simply project the cable with the enlargement through the transverse opening of the hook and, at the same time, give the signal to the engineer to pull away. Hence the shoulder projections 11 are preferably formed with their upper faces 11′ inclined downwardly from the restricted passage 12 and are rounded off from the corresponding front edges of the link 2 so that, in the event the enlargement strikes upon the outer edges of the inclined shoulders when tension is applied to the cable, it would slip off and be free to automatically seat within the chamber.

With this connection, the strains are direct on and between the rope ends, and the removable end 8 is unlikely to be accidentally disconnected from the link 2, when the line is suddenly relieved of strain. Under such conditions the thimbled end 9 will engage and be checked by the projections 11, which terminate the chambering 10, or if it escapes from the open side of the chambering, it is unlikely to be bent and withdrawn through 6.

Having now particularly described my invention, I hereby declare that what I claim as new and desire to be protected in by Letters-Patent, is:

1. A means for connecting together the ends of wire ropes, which ends have thimbled enlargements secured to them, said means comprising a link having at one end an axial aperture adapted to receive the rope with a space between the sides of the link adapted to receive the thimbled enlargement of the rope, said space being approximately double the length of the thimbled enlargement and extending through from side to side of the link, the other end of the link having an axial aperture adapted to receive the wire rope with a chambered space adjacent adapted to receive the enlarged end of the rope, said chambered space being from one side of the link only and in length adapted to prevent endwise movement of the rope, and with a passage for the rope only from the through space of one end to the axial aperture of the other end.

2. In combination, a cable provided at its end with an enlargement, a link with means for connecting a tag line thereto having an opening through which said enlargement is projected, a longitudinal slot leading from said opening on one side through the base of the link for receiving a cable and having its base end closed at one side to form a seat for the inner end of the enlargement, an unconstricted, recessed entrance to said seat, formed beneath the upper end of said slot whereby said enlargement can be automatically seated after being projected through said opening when tension is applied to said cable and whereby the upper end of the enlargement is prevented from displacement by abutment except when turned axially of the opening.

3. In combination, a cable provided at its end with an enlargement and a bull hook with means for connecting a tagline at the upper end thereof and having an opening through which said enlargement is projected, a restricted longitudinal slot communicating with said opening for passing the cable and having shoulders formed therebeneath, a chamber beneath said shoulders having an unconstricted entrance for receiving said enlargement, for seating automatically when tension is applied thereto after being projected through said opening, said slot leading downwardly from said opening on one side of said hook adjacent said chamber to the axes of the base and to form a seat for said enlargement in opposite relation to the shoulders which serve as an abutment only for the upper end of the enlargement thus preventing displacement of the enlargement except when turned at right angles to the axes of the chamber.

4. In combination, a cable provided at its end with an enlargement, and a link with means for connecting a tag line thereto and having an opening through which said enlargement is projected, a longitudinal slot leading from said opening on one side through the base of the link for receiving the cable, and having its base end closed at one side to form a seat for the inner end of the enlargement in opposite relation to the upper end of the longitudinal slot having formed therebeneath an unconstricted, recessed entrance which serves as an abutment for the upper end of the enlargement, the inner walls of said seat bearing definite relation with respect to the longitudinal axis of the opening; said axis coinciding with the longitudinal axis of the hook, whereby the strain through the hook is disposed in said longitudinal axis and whereby said enlargement automatically is seated after being projected through said opening when tension is applied to said cable.

5. In combination, a cable provided at its end with an enlargement, and a bull hook with means for connecting a tag line at the upper end thereof and having an opening through which said enlargement is projected, a restricted, longitudinal slot communicating with said opening for passing the cable and having shoulders formed therebeneath, a chamber beneath said shoulders having an unconstricted recessed entrance for receiving said enlargement for seating automatically when tension is applied thereto after being projected through said opening, said slot leading downward from said opening on one side of said hook adjacent said chamber to the axis of the base and to form a seat for said enlargement in opposite relation to the shoulders which serve as an abutment for the upper end of the enlargement, the inner walls of said seat bearing a definite relation with respect to the longitudinal axis of the opening, said axis coinciding with the longitudinal axis of the hook, whereby the strain through the hook is disposed in said longitudinal axis and kinking of the cable is avoided, and whereby the enlargement automatically is seated after being projected through said opening and which is restricted in its movements by said shoulders against displacement except when turned axially of the opening.

6. In combination, a cable provided at its end with an enlargement and a bull hook with means for connecting a tag line at the upper end thereof and having an opening through which said enlargement is projected, a restricted longitudinal slot communicating with said opening for passing the cable and having shoulders formed therebeneath, the upper faces of said shoulders being inclined downwardly from the restricted slot, a chamber beneath said shoulders having an unconstricted entrance for receiving said enlargement, for seating automatically when tension is applied thereto after being projected through said opening, said slot leading downwardly from said opening on one side of said hook adjacent said chamber to the axis of the base to form a seat for the said enlargement in opposite relation to the shoulders which serve as an abutment only for the upper end of the enlargement thus preventing displacement of the enlargement except when turned at an angle to the axis of the chamber.

Signed at Vancouver, Province of British Columbia, Canada, this 16 day of March A. D. 1926.

JOHN D. McINTOSH.